(12) United States Patent
Humphreys et al.

(10) Patent No.: US 6,642,199 B2
(45) Date of Patent: Nov. 4, 2003

(54) COMPOSITION FOR STRIPPING NICKEL FROM SUBSTRATES AND PROCESS

(75) Inventors: Daniel Humphreys, Lyman, SC (US); Robert Farrell, Wallingford, CT (US)

(73) Assignee: Hubbard-Hall, Inc., Inman, SC (US)

( * ) Notice: Subject to any disclaimer, the term of this patent is extended or adjusted under 35 U.S.C. 154(b) by 38 days.

(21) Appl. No.: 09/838,670

(22) Filed: Apr. 19, 2001

(65) Prior Publication Data

US 2002/0155048 A1 Oct. 24, 2002

(51) Int. Cl.⁷ .................................................. C11D 3/39
(52) U.S. Cl. ...................... 510/434; 510/176; 510/177; 252/79.2; 252/79.3; 252/79.4; 134/3
(58) Field of Search ................................ 510/434, 176, 510/177; 252/79.4, 79.3, 79.2; 134/3

(56) References Cited

U.S. PATENT DOCUMENTS

| | | |
|---|---|---|
| 2,200,782 A | 5/1940 | Vollmer et al. |
| 2,649,361 A | 8/1953 | Springer et al. |
| 2,698,781 A | 1/1955 | Meyer |
| 3,203,787 A | 8/1965 | Grunwald |
| 3,351,556 A | 11/1967 | Tsourmus |
| 3,365,401 A | 1/1968 | Saubestre et al. |
| 3,856,694 A | 12/1974 | Becking |
| 4,052,254 A | 10/1977 | Harbulak et al. |
| 4,111,767 A | 9/1978 | Kawagishi et al. |
| 4,397,753 A * | 8/1983 | Czaja ........................ 252/79.3 |
| 4,548,791 A | 10/1985 | Fletcher et al. |
| 4,720,332 A | 1/1988 | Coffey |
| 4,906,327 A * | 3/1990 | Michaud et al. .............. 216/90 |
| 6,309,476 B1 * | 10/2001 | Ravenscroft et al. ....... 148/252 |

OTHER PUBLICATIONS

Keys to Chelation, Published 1985 by The Dow Chemical Company Organic Chemicals Department.
Organic Chemistry Third Edition James B. Hendrickson, Professor of Chemistry Brandeis University Donald J. Cram Profession of Chemistry University of California at Los Angeles.
Glycine Grace Organic Chemicals Division, W.R. Grace & Co. Six pages.

* cited by examiner

Primary Examiner—Gregory E. Webb
(74) Attorney, Agent, or Firm—Dority & Manning, P.A.

(57) ABSTRACT

A nickel stripping composition is disclosed. The composition can be contacted with a nickel plated article in an aqueous solution in order to remove the nickel. In accordance with the present invention, besides an oxidizing agent, the composition includes the combination of an organic amine and citric acid or salt. Alternatively, other amines containing particular substituent groups can be present in the solution in order to increase the nickel holding capacity of the solution.

23 Claims, No Drawings

COMPOSITION FOR STRIPPING NICKEL FROM SUBSTRATES AND PROCESS

BACKGROUND OF THE INVENTION

Many different types of fabricated articles and parts are plated with nickel or a nickel alloy. For many applications, the nickel or nickel alloy is applied to the part using an electroplating process, although electroless processes have recently become widely used. Unfortunately, many of these types of parts can contain slight or gross imperfections that cause the article to be rejected by prescribed quality standards. Such imperfections can result due to defects in the plastic or metal substrate, improper cleaning of the substrate, excessive porosity of the substrate, impurities in the plating composition, etc.

In many applications, the part containing the imperfection, apart from the defective nickel or nickel alloy deposit, has considerable economic value making it cost prohibitive to scrap the rejected article. Consequently, it becomes necessary to then remove the nickel or nickel alloy coating, reclaim the base substrate, and then recoat the substrate with a nickel containing material.

In the past, various processes have been proposed for stripping defective nickel coatings from substrates. For instance, examples of such processes are disclosed in U.S. Pat. No. 3,351,556, U.S. Pat. No. 3,365,401, U.S. Pat. No. 3,856,694, U.S. Pat. No. 4,052,254, and U.S. Pat. No. 4,548,791, which are all incorporated herein by reference. In general, nickel metals can be removed from a substrate by immersing the article in a bath containing an oxidizing agent. The bath, however, must be able to remove the nickel metal without harming the underlying substrate. For example, many iron parts are nickel plated. In the past, problems have been experienced in damaging the underlying iron surface when removing nickel from the substrate.

In U.S. Pat. No. 4,720,332, which is incorporated herein by reference, a nickel strip formulation is disclosed for stripping nickel and nickel alloys from metallic and non-metallic substrates. In the '332 patent, the nickel strip formulation includes an oxidizing agent such as a suitable organic nitro compound, a sulfide ion which is utilized as a stripping rate catalyst, a pH adjusting compound to adjust the stripping solution to an operating pH range of 7 to 11 and a zwitterion. The zwitterion acts as a complexing agent for the metal being dissolved as well as a buffer to control the pH of the stripping solution.

Although the prior art has made some advances in the past in providing solutions capable of stripping nickel from substrates, the present invention is directed to further improvements in compositions for stripping nickel and nickel alloys from substrates, including stripping nickel from electroless nickel plated articles.

SUMMARY OF THE INVENTION

The present invention is generally directed to a composition for selectively removing materials containing nickel from substrates, such as metal and plastic substrates. In one embodiment, the composition contains an oxidizing agent such as a water soluble nitro substituted cyclic organic ring derivative.

In accordance with the present invention, the composition further contains an organic amine in combination with an organic acid or salt thereof. The organic amine can be a primary amine such as an alkanolamine. Particular examples of organic amines include monoethanol amine, diethanolamine, triethanolamine, isopropanolamine, 2-aminopropanol, 3-aminopropanol, and the like.

The organic acid or salt thereof can be, for instance, citric acid, a citric acid salt, boric acid or a boric acid salt. The organic acid or salt should be present within the composition in an amount sufficient to neutralize the organic amine. It has been discovered by the present inventors that the combination of an organic amine with an organic acid or salt significantly increases the nickel holding capacity of a solution containing the composition.

When present as an aqueous solution, the composition can contain the oxidizing agent in an amount from about 20 grams per liter to about 120 grams per liter and can contain the organic amine in an amount from about 4 grams per liter to about 120 grams per liter. The pH of the solution should be at least 6.5, and particularly from about 6.5 to about 12.

The nickel stripping composition of the present invention can also contain various other ingredients. For instance, the composition can contain a sulfide ion catalyst, a carboxylic acid or salt thereof, a chlorite such as a chlorate or a hypochlorite, a surfactant, and a pH adjuster. The pH adjuster can be a carbonate, a phosphate, or a hydroxide.

In an alternative embodiment of the present invention, a second type of amine can be present within the composition as an alternative to or in addition to the organic amine. The second amine can be an amine or a salt thereof which includes a substituent group containing —OH, —NH$_2$, —NH, —SH, —C=O, —SO$_3$, or —NO$_2$. Examples include hydroxylamines and acid and alkali metal salts thereof. For example, the composition can contain hydroxylamine sulfate. Other examples include hydrazines and salts thereof, sulfamic acids and salts thereof, and urea. Urea has been found to work particularly well in a nickel stripping solution. For example, urea has been found to prevent sludge build-up, improve clarity, and provide thermal stability.

The above identified amine containing the listed substituent groups can be present in the nickel stripping composition with any of the other ingredients listed above.

The present invention is also directed to a process for removing a material containing nickel from a substrate. The process includes the steps of providing an article comprising a substrate coated with a material containing nickel. The article is contacted with an aqueous stripping solution configured to remove the nickel containing material. The aqueous stripping solution can include an oxidizing agent, an amine, and an organic acid or salt. The solution can also contain a sulfide ion catalyst, a pH adjuster, a carboxylic acid or salt thereof, a chlorite, and/or a surfactant.

The pH of the aqueous stripping solution can be from about 6.5 to about 12 when contacted with the article, and particularly can have a pH from about 8 to about 10.

The temperature of the solution can vary from about 60° F. to about 200° F., and particularly from about 150° F. to about 180° F. The article can be contacted with the solution for a time of from about one ½ hour to about 24 hours, and particularly from about one ½ hour to about 1½ hours.

Other features and aspects of the present invention are discussed in greater detail below.

DETAILED DESCRIPTION OF PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents.

The present invention is directed to an improved liquid or powder composition which is configured to selectively strip nickel and nickel alloy coatings from articles without attacking the underlying substrate. Of particular advantage, the composition of the present invention can remove all types of nickel coatings, including electroless nickel coatings of low, medium or high phosphorus content. In the past, these types of coatings have typically been removed with the aid of electricity or with the inclusion of an extra step of placing the article in a strongly acidic bath, such as a nitric acid bath.

The composition of the present invention contains an oxidizing agent for oxidizing the nickel in combination with various other ingredients. For example, in one embodiment of the present invention, the composition further contains an organic amine in combination with an organic acid or salt. It has been discovered by the present inventors that adding an organic amine in combination with an organic acid or salt is greatly improves the nickel holding capacity of the resulting stripping solution.

In an alternative embodiment of the present invention, the composition can include an amine or salt thereof that includes a substituent group containing —OH, —NH$_2$, —NH, —SH, —C=O, —SO$_3$, or —NO$_2$, This amine can be used alone or in combination with the organic amine identified above. The present inventors have discovered that particular amines having the above substituent groups can also greatly increase the nickel holding capacity of the stripping solution.

Besides having improved nickel holding capacity, stripping solutions made in accordance to the present invention also have increased temperature stability. In fact, the solution can be used to remove nickel at ambient temperature. Further, the stripping solution of the present invention can also operate over a wide pH range.

The oxidizing agent contained within the nickel stripping composition of the present invention can vary depending upon the particular application. For most applications, any suitable water-soluble nitro substituted cyclic organic ring derivative can be used. For instance, in one embodiment, a meta-, an ortho-, or a para-nitrobenzine sulfonic acid or sulfonate can be used. When using a sulfonate, the sulfonate can be a metal salt, such as a potassium or sodium salt.

Other various oxidizing agents that can be used in the present invention are described in U.S. Pat. No. 2,200,782, U.S. Pat. No. 2,649,361, U.S. Pat. No. 2,698,781, U.S. Pat. No. 3,203,787, and U.S. Pat. No. 4,720,332 which are all incorporated herein by reference.

When brought into contact with nickel, the oxidizing agent oxidizes the nickel. The oxidized nickel is thus removed from the article being treated and enters into solution.

The concentration of the oxidizing agent present within the stripping solution can vary depending upon the particular application, the type of nickel material being removed from the article and the amount of the nickel being removed. For most applications, however, the oxidizing agent can be present in the stripping solution in a concentration of from about 20 grams per liter to about 120 grams per liter, and particularly from about 60 grams per liter to about 90 grams per liter.

In accordance with the present invention, in addition to the oxidizing agent, the stripping solution can contain the combination of an organic amine and an organic acid or salt. The organic amine can be substituted and is generally a water-soluble primary amine. Organic amines that can be used in the present invention include alkanolamines, such as monoethanolamine, diethanolamine, triethanolamine, isopropanolamine, 2-aminopropanol, 3-aminopropanol, and the like. For most applications, the organic amine can be present within the stripping solution in an amount from about 4 grams per liter to about 120 grams per liter, and particularly from about 40 grams per liter to about 90 grams per liter.

The organic acid or salt is generally added to the stripping solution in substantially stoichiometric amounts with respect to the organic amine. The organic acid or salt neutralizes or buffers the amine. More particularly, it is believed that the organic amine and the organic acid or salt form a time release combination. The organic amine assists in nickel dissolution. When the organic amine and the organic acid or salt are combined, it is believed that an exothermic reaction occurs which produces a salt or soap and reaches an equilibrium in the aqueous stripping solution. Ultimately, the present inventors have found the organic amine and organic acid or salt combination significantly increase the holding capacity of the nickel stripping bath.

Besides increasing the nickel stripping capacity of the bath, it has also been discovered that the combination of the organic amine and the organic acid or salt also reduces the vapor pressure of the stripping solution, even at higher temperatures. Thus, the stripping solution of the present invention has increased temperature stability.

In one embodiment, the organic acid or salt used in the present invention is boric acid, citric acid or a salt thereof. Particular salts that are suitable include the alkali metal salts, such as sodium or potassium salts or ammonium salts. Other suitable organic acids include maleic acid, lactic acid, glycolic acid, erythoribic acid, and the like.

Besides forming a complex with the organic amine and improving the nickel holding capacity of the stripping solution, the addition of an organic acid or salt to the stripping solution also provides other benefits. For instance, the organic acid or salt also serves as an antioxidant and a buffering agent. The organic acid or salt also serves as a heat stabilizer and can tie up metal ions when not bound to an amine.

In addition to or as an alternative to the organic amine, the stripping solution of the present invention can also contain other amines. For example, the other amine can be an amine or salt thereof including a substituent group containing an —OH group, —NH$_2$ group, —NH group, —SH group, —C=O group, —SO$_3$ group, or —NO$_2$ group. The —OH group, —NH$_2$ group, —NH group, —SH group, —SO$_3$ group or —C=O group can be placed adjacent to an amine group. Additionally, the amine can have certain organic substituents such as linear, branched or cyclic moieties as part of the compound. These amines can be present as acid salts such as sulfates, alkali metal salts such as sodium and potassium salts, or as quaternary amine salts. Particular examples of such amines include hydroxylamines, hydrazines, sulfamic acid, urea and salts thereof.

Although it is believed that the above amines will not react with an organic acid or an organic acid salt, it has been discovered that the above amines enhance kinetics of the nickel process. The amines are particularly helpful in electroless nickel-phosphorus coatings.

As mentioned above, in one embodiment, urea is present within the formulation. It has further been discovered that when present urea prevents sludge build-up and improves clarity and provides thermal stability to the composition.

The above amines can be present in the stripping solution in an amount from about 1 ppm to saturation, and particularly in an amount from about 40 grams per liter to about 90 grams per liter.

Besides an oxidizing agent, at least one amine, and an organic acid or salt, the stripping formulation of the present invention can contain various other ingredients. For example, if desired, a sulfide ion catalyst can be added. Examples of sulfide ion catalysts include thiosulfate derivatives, such as thiosulfuric acid, and the alkali metal and ammonium salts thereof, such as sodium thiosulfate and potassium thiosulfate. The sulfide ion catalyst can be present in the stripping solution in an amount from about 0.2 grams per liter to about 90 grams per liter, and particularly from about 0.5 grams per liter to about 3 grams per liter. The sulfide ion catalyst when present accelerates oxidation of the nickel material.

Another ingredient that can be added to the nickel stripping solution is a carboxylic acid or salt thereof, including polycarboxylic acids and salts thereof. The salts of the carboxylic acid can be, for instance, alkali metal salts such as sodium and potassium salts and ammonium salts. When present, the carboxylic acid or salt reversibly binds to nickel and other heavy metals. The carboxylic acid or salt prevents sludge build-up and is especially desired when the stripping solution contains relatively large amounts of nickel.

Particular examples of carboxylic acid salts that can be used in the present invention include polyacrylates, such as sodium polyacrylate or potassium polyacrylate. The carboxylic acid or salt thereof can be present in the solution in an amount from about 1 ppm to saturation and particularly in an amount of about 0.1 lbs per gallon.

Still another ingredient that can be added to the stripping formulation is a chlorite, including alkali chlorates and hypochlorites. The chlorite can be added to the solution in an amount from about 0.1 grams per liter to about 90 grams per liter. When present in combination with the oxidizing agent, particularly with a nitro substituted cyclic organic ring component, it has been discovered that the chlorite accelerates the stripping rate especially on electroless nickel plated articles. For example, in one embodiment, sodium chlorite can be added to the stripping solution at a concentration of from about 20 grams per liter to about 60 grams per liter.

If desired, a surfactant can also be added to the nickel stripping formulation in order to lower surface tension and better modulate the removal. In general, any suitable surfactant can be added to the formulation. For instance, anionic surfactants, nonionic surfactants, cationic surfactants, and amphoteric surfactant can be used.

In still further embodiments of the present invention, various other ingredients can be used in order to increase the nickel holding capacity of the stripping solution. For example, in one embodiment, glycine can be added to the solution. In another embodiment, polyethylenimine can be added to the stripping solution.

In general, the pH of the stripping solution should be greater than about 6.5 in order to protect the substrate that is coated by the nickel material. The nickel stripping solution of the present invention can have a pH of from about 6.5 to about 12, and particularly from about 8 to about 10. If desired, a pH adjuster can be added to the solution. pH adjusters can include, for instance, carbonates, phosphates, borates and hydroxides such as sodium hydroxide or potassium hydroxide.

In one embodiment, a carbonate compound can be added to the stripping solution in an amount from about 4 grams per liter to about 160 grams per liter in order to maintain the pH within the desired limits. The carbonate compound can be carbonic acid, the alkali metal and ammonium salts thereof and mixtures thereof. For example, in one particular embodiment, soda ash is added to the stripping solution in an amount from about 20 grams per liter to about 70 grams per liter.

In using the composition of the present invention to strip nickel from substrates, the above ingredients are generally combined in an aqueous solution. The nickel plated article is then immersed in the stripping solution. The stripping solution can be heated or can be at ambient temperature. For instance, the temperature of the solution can be from about 60° F. to about 200° F., and particularly from about 150° F. to about 180° F. The amount of time the article is contacted with the solution generally depends upon the particular application. Under most circumstances, however, the article can be left in the bath under agitation, such as in a rotary barrel, for a length of time from about one ½ hour to about 24 hours and particularly from about one ½ hour to about 1½ hours.

After processing, the nickel containing material is stripped from the article and the article is removed from the bath and reused as desired. The bath, on the other hand, can undergo various conventional processing steps in order to remove the dissolved nickel. For example, in one embodiment, the bath itself can be used to produce stainless steel. Alternatively, a precipitating agent, such as dithiocarbamate can be added to the bath causing the nickel to precipitate. The solution can be filtered and nickel can be recovered from the filter cake.

The present invention may be better understood with reference to the following examples:

EXAMPLE 1

A composition containing the following ingredients was prepared to a final aqueous concentration of 2.5#/gallon and heated to 180° F. (all units are in pounds)

7.00 Sodium meta-nitrobenzene sulfonate
6.75 Monoethanolamine
3.63 Citric acid
3.50 Soda ash
3.30 Sodium thiosulfate
2.00 Glycine
0.70 Sodium polyacrylate A mild steel article coated with nickel was immersed into this solution for one hour and afterwards, was checked visibly for nickel. There were no signs of nickel present.

EXAMPLE 2

A composition containing the following ingredients was prepared to a final aqueous concentration of 2.5#/gallon and heated to 180° F.

73.12 Water
7.0 Sodium meta-nitrobenznene sulfonate 6.75 Monoethanolamine
3.63 Boric acid
3.30 Sodium thiosulfate
2.0 Glycine
0.70 Sodium polyacrylate A mild steel article coated with nickel was immersed into this solution for one hour and afterwards, was checked visibly for nickel. There were no signs of nickel present.

EXAMPLE 3

A composition containing the following ingredients was prepared to a final aqueous concentration of 2.5#/gallon and heated to 180° F.

73.12 Water
7.0 Sodium meta-nitrobenzene sulfonate
6.75 Monoethanolamine
3.63 Citric acid
3.30 Sodium thiosulfate
2.0 Urea
0.70 Sodium polyacrylate A mild steel article coated with nickel was immersed into this solution for one hour and afterwards, was checked visibly for nickel. There were no signs of nickel present.

EXAMPLE 4

A composition containing the following ingredients was prepared to a final aqueous concentration of 2.5#/gallon and heated to 180° F.

22.04 Sodium meta-nitrobenzene sulfonate
28.56 Hydroxylamine sulfate
13.50 Sodium citrate
12.28 Sodium thiosulfate
2.60 Sodium polyacrylate A mild steel article coated with nickel was immersed into this solution for one hour and afterwards, was checked visibly for nickel. There were no signs of nickel present.

EXAMPLE 5

A composition containing the following ingredients was prepared to a final aqueous concentration of 2.5#/gallon and heated to 180° F.

22.04 Sodium meta-nitro benzene sulfonate
28.56 Hydroxylamine sulfate
13.50 Sodium citrate
12.50 Sodium thiosulfate
2.60 Sodium polyacrylate
12.50 Urea A mild steel article coated with nickel was immersed into this solution for one hour and afterwards, was checked visibly for nickel. There were no signs of nickel present.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A composition for selectively removing materials containing nickel from substrates comprising:
    an oxidizing agent capable of oxidizing nickel;
    an amine, the amine comprising a material selected from the group consisting of alkanolamines: hydroxylamines, and salts thereof; and
    an organic acid, boric acid, or a salt thereof, said organic acid, boric acid or salt thereof neutralizing said amine, said organic acid , boric acid or salt thereof and said amine being present in said composition in an amount sufficient to increase the nickel holding capacity of said composition, and wherein the composition has a pH of greater than 6.5 when present in an aqueous solution.

2. A composition as defined in claim 1, wherein said composition further comprises a sulfide ion catalyst.

3. A composition as defined in claim 1, wherein said oxidizing agent comprises a nitro substituted cyclic organic ring derivative.

4. A composition as defined in claim 1, wherein said amine comprises a material selected from the group consisting of monoethanolamine, diethanolamine, triethanolamine, isopropanolamine, 2-aminopropanol, 3-aminopropanol, and mixtures thereof.

5. A composition as defined in claim 1, wherein said composition includes a second amine comprising an amine or salt thereof including a substituent group comprising —OH, —NH$_2$, —NH, —SH, —C=O, $\Delta$SO$_3$, or —NO$_2$.

6. A composition as defined in claim 1, further comprising urea.

7. A composition as defined in claim 1, further comprising a hydrazine or a salt thereof.

8. A composition as defined in claim 1, wherein said organic acid, boric acid or salt thereof comprises citric acid, boric acid or a salt thereof.

9. A composition as defined in claim 1, wherein said organic acid, boric acid or salt thereof comprises a material selected from the group consisting of maleic acid, lactic acid, glycolic acid, erythoribic acid and salts thereof.

10. A composition as defined in claim 1, wherein said composition has a pH of at least 8.0 when present in an aqueous solution.

11. A composition as defined in claim 1, further comprising a carboxylic acid or salt thereof and a pH adjuster.

12. A composition as defined in claim 1, comprising an aqueous solution containing said oxidizing t at a concentration of from about 20 grams per liter to about 120 grams per liter and containing said amine at a concentration of from about 4 grams per liter to about 120 grams per liter.

13. A composition for selectively removing materials containing nickel from substrates comprising:
    an oxidizing agent capable of oxidizing nickel; and
    at least a first amine or salt thereof including a substituent group containing —OH, —NH$_2$, —NH, —SH, —C=O, —SO$_3$, or —NO$_2$, said first amine being present in said composition in an amount sufficient to increase the nickel holding capacity of said composition, and wherein the composition has a pH of greater than 6.5 when present in an aqueous solution.

14. A composition as defined in claim 13, further comprising a sulfide ion catalyst, a pH adjuster, and a carboxylic acid or salt thereof.

15. A composition as defined in claim 13, further comprising a second amine, said second amine comprising an organic amine or salt thereof.

16. A composition as defined in claim 15, wherein said organic amine comprises an alkanolamine.

17. A composition as defined in claim 13, wherein said oxidizing agent comprises a nitro substituted cyclic organic ring derivative.

18. A composition as defined in claim 13, wherein said first amine comprises urea or a salt thereof.

19. A composition as defined in claim 14, wherein said first amine comprises a material selected from the group consisting of a hydroxylamine, a hydrazine, sulfamic acid, and a salt thereof.

20. A composition as defined in claim 13, further comprising an organic acid or salt thereof.

21. A composition as defined in claim 13, wherein said first amine comprises sulfamic acid or a salt thereof.

22. A composition for selectively removing materials containing nickel from substrates comprising:

an oxidizing agent capable of oxidizing nickel;

an organic amine;

urea; and an organic acid, boric acid or a salt thereof, said organic acid, boric acid or salt thereof neutralizing the organic amine, the organic acid, boric acid, or salt thereof and said organic amine being present in the composition in an amount sufficient to increase the nickel holding capacity of the composition.

23. A composition for selectively removing materials containing nickel from substrates comprising:

an oxidizing agent capable of oxidizing nickel;

an organic amine; and an organic acid or salt thereof, the organic acid or salt thereof comprising a material selected from the group consisting of maleic acid, lactic acid, glycolic acid, erythoribic acid, and salts thereof, the organic acid or salt thereof neutralizing the organic amine, the organic acid or salt thereof and the organic amine being present in the composition in an amount sufficient to increase the nickel holding capacity of the composition.

* * * * *

UNITED STATES PATENT AND TRADEMARK OFFICE
CERTIFICATE OF CORRECTION

PATENT NO. : 6,642,199 B2
DATED : November 4, 2003
INVENTOR(S) : Daniel Humphreys and Robert Farrell It is certified that error appears in the above-identified patent and that said Letters Patent is hereby corrected as shown below:

Column 8,
Line 46, "t" should read -- agent --

Signed and Sealed this

Second Day of August, 2005

JON W. DUDAS
*Director of the United States Patent and Trademark Office*